J. A. MALM.
VIBRATORY STRAW CARRIER.
APPLICATION FILED MAR. 22, 1916.
1,203,760.
Patented Nov. 7, 1916.
2 SHEETS—SHEET 1.
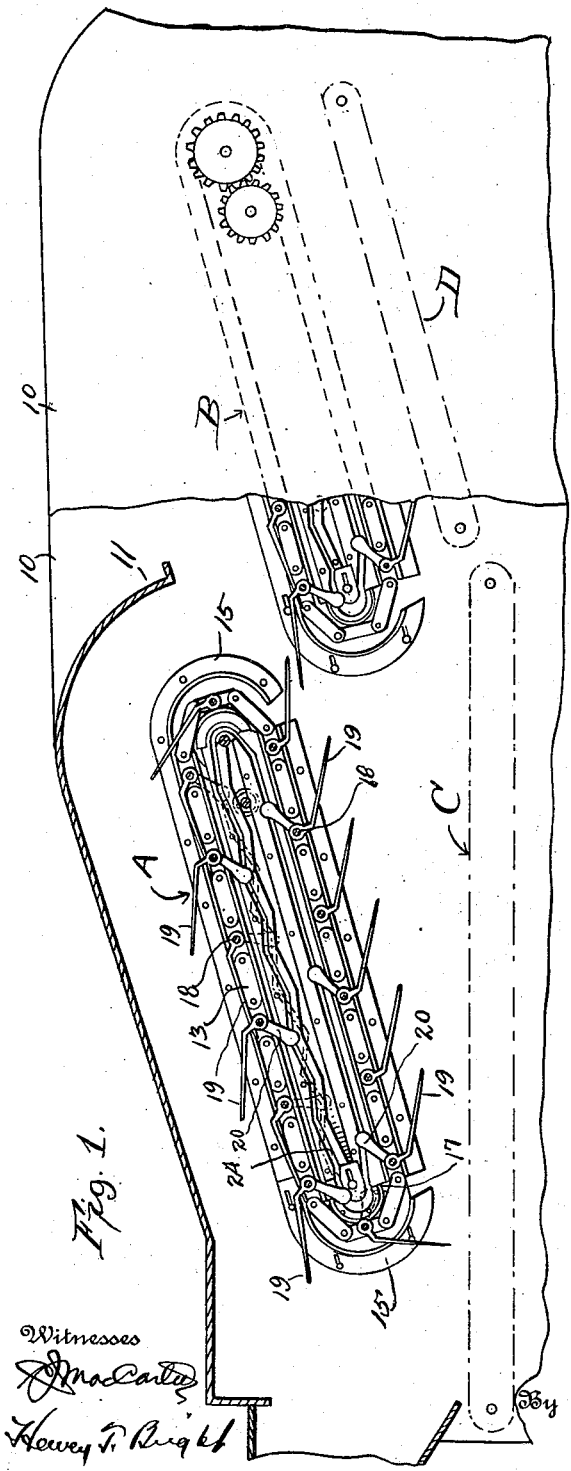
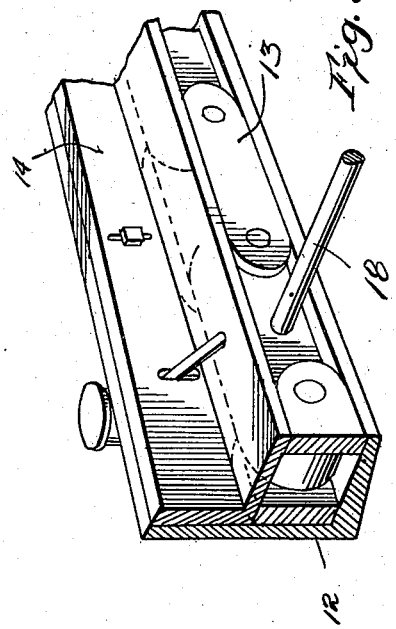
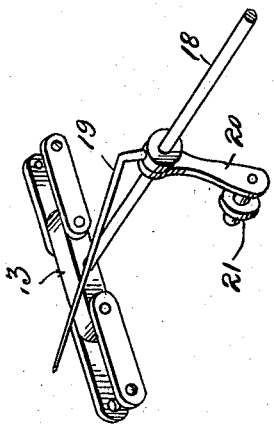
Inventor
J. A. Malm
Witnesses
Attorney

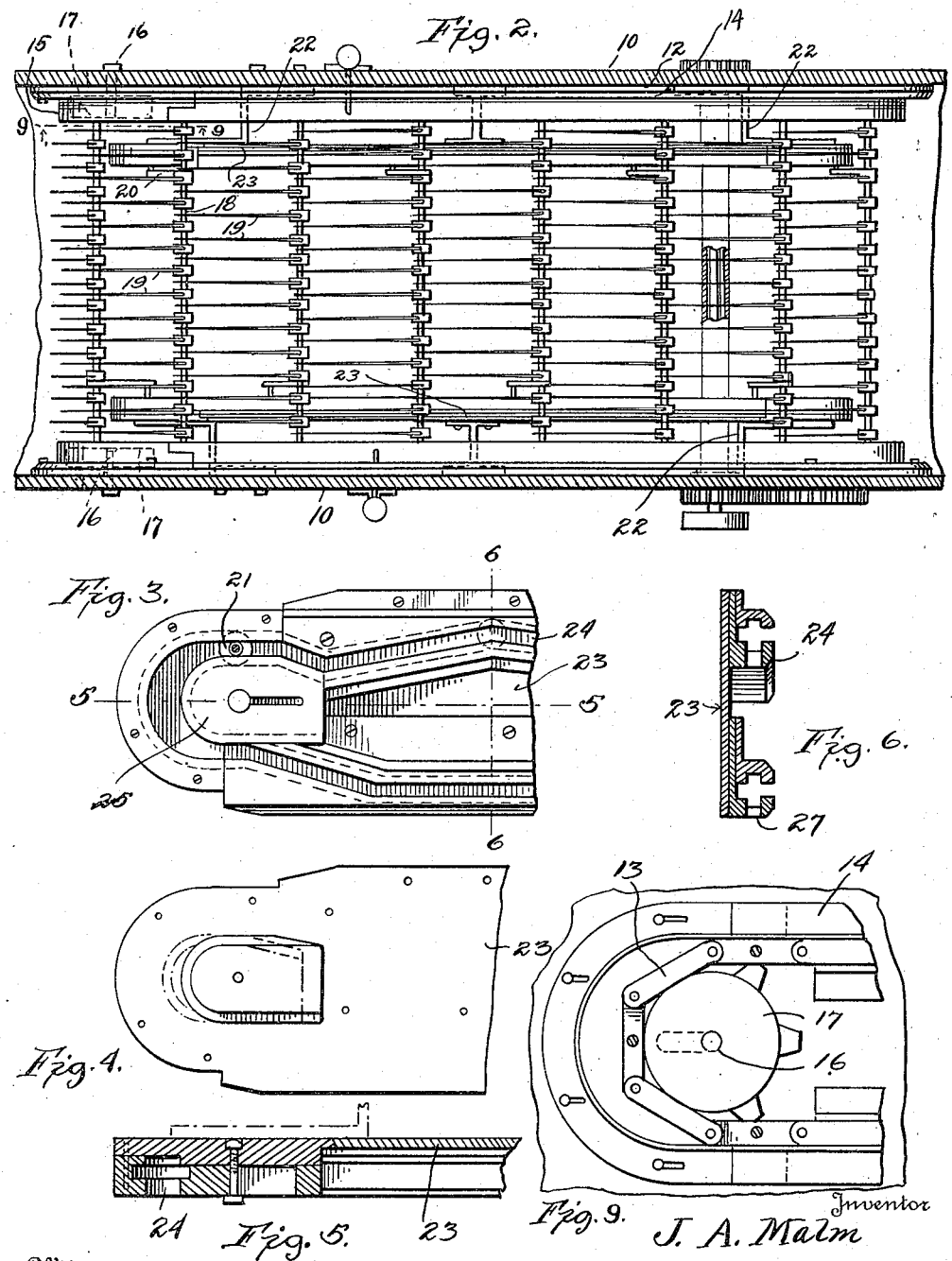

UNITED STATES PATENT OFFICE.

JOHN A. MALM, OF DIAMOND, SOUTH DAKOTA.

VIBRATORY STRAW-CARRIER.

1,203,760.   Specification of Letters Patent.   Patented Nov. 7, 1916.

Application filed March 22, 1916. Serial No. 86,024.

*To all whom it may concern:*

Be it known that I, JOHN A. MALM, a citizen of the United States, residing at Diamond, in the county of Roberts, State of South Dakota, have invented certain new and useful Improvements in Vibratory Straw-Carriers; and I do hereby declare the following to be a full, clear, and exact description of the invention, such as will enable others skilled in the art to which it appertains to make and use the same.

This invention relates to vibrating straw carriers for threshing machines.

The object of the invention is to provide a straw carrier of the type named embodying an improved construction whereby the use of crank shafts and pitmen for vibrating the carrier is eliminated and jerking and jarring of the threshing machine obviated.

A further object of the invention is to provide a straw carrier which will move the straw with great rapidity and thereby keep the sheet of straw very thin to render it easy for the grain to pass through the straw to the grain pan.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a side elevation of a threshing machine partly in section and showing my improved straw carrier applied, one of the carriers being shown entirely in section and the grain pans being shown in dotted lines; Fig. 2, a plan view of one of the straw carriers shown in Fig. 1; Fig. 3, a fragment of the frame or plate which supports the straw carrier looking at the inner side of the plate and showing the means for adjusting the cam guide; Fig. 4, a view similar to Fig. 3 with the cam guide removed; Fig. 5, a section on the line 5—5 of Fig. 3; Fig. 6, a section on the line 6—6 of Fig. 3; Fig. 7, a perspective view showing a fragment of one of the chains and one of the vibrating fingers of the straw carrier; Fig. 8, a perspective view of a fragment of the chain guides, and Fig. 9, an enlarged section on the line 9—9 of Fig. 2.

Referring to the drawings the side walls of the threshing machine are indicated at 10 and mounted between these walls are the straw conveyers A and B, the former delivering to the latter and the straw during such delivery being guided by a plate 11. Mounted between the walls 10 beneath the carriers A and B respectively are grain pans C and D.

As the straw carriers A and B are identical in construction only the carrier A will be described in detail. Mounted on the inner side of each wall 10 is an endless guide member 12 in which travels an endless chain 13. Each guide 12 includes an adjustable section 14 whereby the play of the chain incident to its wear may be readily eliminated. Each guide member 12 embodies an adjustable end section 15 carrying a stub shaft 16 on which is rotatably mounted a sprocket wheel 17, the related chain 13 traveling over said sprocket wheel. By this construction it will be obvious that the chains 13 can be tightened by adjusting the sections 15 outwardly. The chains 13 are connected by rods 18 which are rotatably mounted in corresponding links of the chains 13. Fixed on each rod 18 is a plurality of vibrating fingers 19 for a purpose that will presently appear. Also fixed on each rod 18 is an arm 20 carrying at its free end a roller 21, it being noted that the arms 20 on adjacent rods 18 are disposed at opposite ends of said rods respectively. Secured to each side wall 10 are brackets 22 which support a plate 23. Secured to each of the plates 23 is an endless cam guide 24 including an adjustable end element 25 and adjustable upper and lower elements 26 and 27. The rollers 21 on adjacent arms 20 travel in a given cam guide 24. The upper reach of each guide 24 is so shaped that its coaction with the rollers 21 will impart a simultaneous oscillating movement to the fingers 19 on alternate rods 18. It will be noted that the upper reach of one cam guide 24 is shaped opposite to the upper reach of the other cam guide so that during travel of the chains 13 the upper fingers 19 on one rod 18 will move oppositely to the fingers on the adjacent rods 18 and thus impart an efficient vibratory movement to the straw as same is moved bodily by the carrier.

The carriers A and B may be operated through the medium of suitable connections with a source of power but it is desirable to so connect the carrier B that it will travel faster than the carrier A so that the straw delivered on the former will be relatively thin and sparse so as to permit the remaining grain to fall on the grain pan D.

What is claimed is:—

1. A straw carrier for threshing machines comprising spaced endless traveling members, a plurality of rods connecting the members and rotatably mounted therein, cam guides within the endless members respectively, arms fixed on said rods, rollers on said arms, the rollers on the arms of adjacent rods coöperating with respective cam guides to oscillate said rods oppositely during travel of the members, and fingers fixed on said rod.

2. A straw carrier for threshing machines comprising spaced endless traveling members, means for tightening said members, a plurality of rods connecting the members and rotatably mounted therein, cam guides within the endless members respectively, means for lengthening and shortening said guides, arms fixed on said rods, rollers on said arms, the rollers on the arms of adjacent rods coöperating with respective cam guides to oscillate said rods oppositely during travel of the members, and fingers fixed on said rods.

In testimony whereof, I affix my signature, in the presence of two witnesses.

JOHN A. MALM.

Witnesses:
HOMER A. LEAVITT,
HUBERT LEAVITT.

Copies of this patent may be obtained for five cents each, by addressing the "Commissioner of Patents, Washington, D. C."